United States Patent [19]
Nakajima

[11] Patent Number: 4,532,420
[45] Date of Patent: Jul. 30, 1985

[54] FOCUS DETECTOR WITH CHARACTERISTIC POINT DETECTION

[75] Inventor: Yukio Nakajima, Kanagawa, Japan

[73] Assignee: Olympus Optical Co., Ltd., Japan

[21] Appl. No.: 432,318

[22] Filed: Oct. 1, 1982

[30] Foreign Application Priority Data

Dec. 9, 1981 [JP] Japan .................. 56-198130

[51] Int. Cl.³ .......................... G01J 1/20
[52] U.S. Cl. .................... 250/201; 250/204; 354/405
[58] Field of Search ........... 250/201 PF, 204; 356/4; 354/402, 404, 405, 406, 407, 408

[56] References Cited

U.S. PATENT DOCUMENTS

| 4,217,043 | 8/1980 | Momose et al. | 354/405 |
| 4,255,028 | 3/1981 | Aoki | 354/402 |
| 4,305,657 | 12/1981 | Masunaga et al. | 250/201 PF |
| 4,319,813 | 3/1982 | Aoki et al. | 250/201 PF |
| 4,394,569 | 7/1983 | Nakamura | 250/204 |

FOREIGN PATENT DOCUMENTS

5650315 10/1979 Japan .
56-32126 4/1981 Japan .

Primary Examiner—David C. Nelms
Assistant Examiner—J. Gatto
Attorney, Agent, or Firm—Ostrolenk, Faber, Gerb & Soffen

[57] ABSTRACT

A focus detector of image correlation type projects an image of an object onto a first and a second array of photoelectric transducer elements. Each of the transducer elements produces an output in accordance with the distribution of light intensity of image incident thereon. A characteristic point is retrieved from the distribution of outputs from the first array, and a corresponding characteristic point is retrieved from the distribution of outputs from the second array which corresponds to the first mentioned characteristic point. An in-focus condition is detected on the basis of the relative position between those transducer elements which produce outputs for these characteristic points.

6 Claims, 9 Drawing Figures

FOCUS DETECTOR WITH CHARACTERISTIC POINT DETECTION

BACKGROUND OF THE INVENTION

The present invention relates to a focus detector, and more particularly, to a focus detector of so-called image correlation type in which the image of an object being focussed is projected onto a pair of arrays of photoelectric transducer elements so that an in-focus condition may be detected on the basis of a relative position of the images on these arrays.

Focus detectors of vertical image alignment type, dual image coincidence type or split pupil type are designed to detect an in-focus condition on the basis of the relative position of two images, and are referred to as focus detectors of image correlation type, as distinguished from focus detectors of contrast type in which an in-focus condition is detected by the evaluation of the sharpness of an image. A focus detector of the image correlation type permits the detection of an in-focus detection with a high accuracy and in a facilitated manner, providing a major advantage that a front or a rear focus, both of which represent an out-of-focus condition, may be detected as well as the degree of offset from the in-focus condition. Accordingly, a focus detector of image correlation type finds extensive applications in optical or opto-electrical instruments such as auto-focus cameras and VTR cameras. Such focus detector projects the optical image of an object being focussed onto a pair of arrays of photoelectric transducer elements, the outputs of which are utilized to detect the relative position of the projected images in order to provide an automatic determination of an in-focus condition.

In a conventional focus detector of image correlation type, a relative position of images on the arrays is determined on the basis of a distribution of outputs from the photoelectric transducer elements in a first and a second array. To this end, an evaluation function is derived from an integral or summation of the absolute values of differences, each formed between transducer elements from the first and the second array when one output from one of the arrays is combined with an output from the other array which is displaced by one pitch or element in a sequential manner, the evaluation function being obtained as an average formed by dividing the accumulation by the number of samples. The pitch or the number of elements by which the transducer elements, from which outputs are taken to form a difference, are displaced or staggered from each other is changed, and a corresponding evaluation function is derived. An in-focus condition is detected as a combination which produces a minimum value of the evaluation function.

Figure 2:
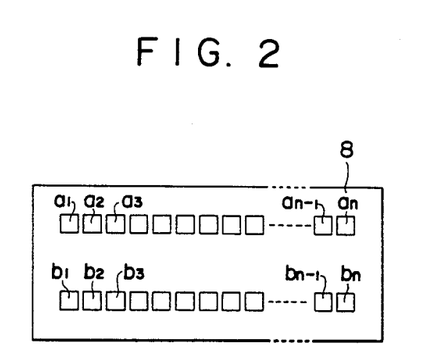
FIG. 2 is an enlarged top view of a light receiver shown in FIG. 1.
Figure 6:
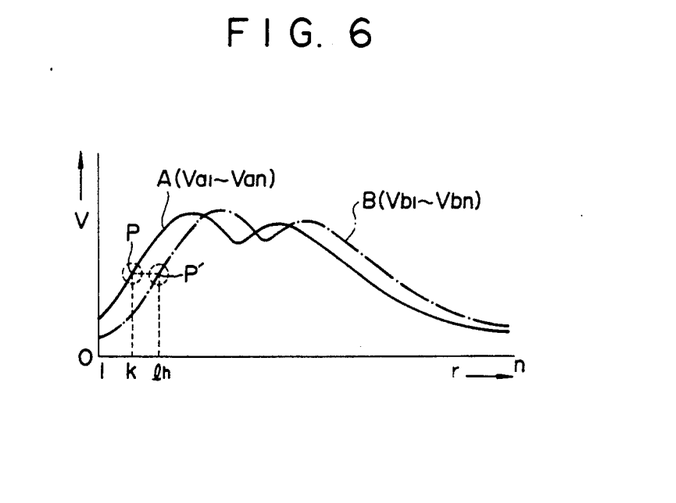
FIG. 6 graphically shows distributions of outputs from arrays of photoelectric transducer elements, also indicating maximum slope points, chosen as the characteristic points and which are retrieved by the flow chart shown in FIG. 5.

Specifically, referring to FIG. 6, a solid line curve A indicates a distribution of outputs $Va_1$ to $Va_n$ from a first array of photoelectric transducer elements $a_1$ to $a_n$ (see FIG. 2), and a phantom line curve B shows a distribution of outputs $Vb_1$ to $Vb_2$ from a second array of photoelectric transducer elements $b_1$ to $b_n$ (see FIG. 2). In order to determine an in-focus condition, the following functions are calculated:

$$R_0 = \frac{1}{n} \sum_{r=1}^{n} |Var - Vbr|$$

-continued
$$R_1 = \frac{1}{n-1} \sum_{r=1}^{n-1} |Var - Vbr+1|$$

$$R_2 = \frac{1}{n-2} \sum_{r=1}^{n-2} |Var - Vbr+2|$$

$$\vdots$$

$$R_k = \frac{1}{n-k} \sum_{r=1}^{n-k} |Var - Vbr+k|$$

$$\vdots$$

$$R_{n-1} = \frac{1}{n-(n-1)} \sum_{r=1}^{n-(n-1)} |Var - Vbr+(n-1)|$$

When $R_l$ represents a minimum value, the value of the suffix 1 is determined as an offset in the relative position of images which represents an in-focus condition. Stated differently, a conventional arrangement is constructed to compare images projected onto the respective arrays in as many different combinations as possible to see how much the images may be displaced or staggered from each other to achieve a coincidence between the both images. Accordingly, an arithmetic unit of an increased size is disadvantageously required for the calculation of the value of the evaluation functions $R_0$ to $R_{n-1}$ as well as their comparison. In addition to the increased size of the arithmetic unit, the calculation requires an increased length of time for the increased number of arithmetic operations, and hence an increased length of time is required until an in-focus condition is detected.

However, it should be noted that since images of a common object being focussed are projected onto the respective arrays, the distribution of transducer outputs $Va_1$ to $Va_n$ and $Vb_1$ to $Vb_n$ should conform to each other even though they are laterally displaced relative to each other. Hence it is unnecessary to detect a relative offset by comparing them in an increased number of combinations, but an offest indicative of an in-focus should be detected by examining the relative position of characteristic points in the respective distributions $Va_1$ to $Va_n$ and $Vb_1$ to $Vb_n$.

SUMMARY OF THE INVENTION

In view of the foregoing, it is an object of the invention to provide a focus detector in which a characteristic point is retrieved from a distribution of outputs from a first array of photoelectric transducer elements, and similarly a corresponding characteristic point is retrieved from a distribution of outputs from a second array of photoelectric transducer elements which corresponds to the characteristic point in the first array and in which an in-focus condition is determined on the basis of a relative position of the particular transducer elements in the first and the second array which produce the outputs for the characteristic points.

The retrieval of characteristic points from the distributions of outputs from the arrays of photoelectric transducer elements and the determination of an in-focus condition on the basis of the relative position between the characteristic points drastically reduces the number of arithmetic operations required, as compared with a conventional arrangement. The reduction in the number of required arithmetic operations also reduces the time required to determine an in-focus condition and allows simplification or reduction in size of the apparatus needed.

The characteristic points may be chosen as the points in the distribution of transducer outputs where the slope is at its maximum. At such point, the brightness of an image changes most rapidly. It will be understood that a visual focussing operation is based on such region, and hence such choice allows a practical detection of an in-focus condition with an acceptable accuracy.

Alternatively, the characteristic points may be chosen at points in a distribution of transducer outputs where the second derivative or curvature is at its maximum. The brightness of an image at this point is at its highest or lowest level as compared with the brightness level of its surrounding area. This also allows a practical detection of an in-focus detection with a high accuracy.

DESCRIPTION OF PREFERRED EMBODIMENTS

Figure 1:
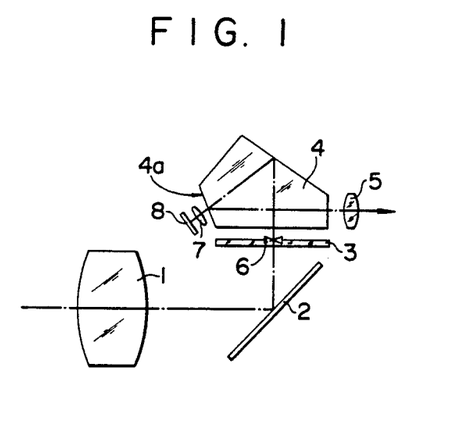
FIG. 1 is a schematic illustration of an optics system in which the focus detector of the invention may be applied.

Referring to FIG. 1, there is shown one form of optics system in which the focus detector of the invention may be employed. The optics system shown is designed for a single lens reflex camera which includes a taking lens 1. Light from an object being photographed which passes through the lens 1 is reflected by a movable reflecting mirror 2 to focus the image of the object on a focussing glass 3. The image can be observed through a pentaprism 4, a finder eyepiece 5 and a finder window (not shown). The focussing glass 3 is formed with a well known split prism 6 which is formed by a pair of wedge-shaped prisms having oppositely inclined surfaces and joining together at their center where a focal plane is defined. A front lower surface of the pentaprism 4 which represents the final reflecting surface is formed as a half mirror surface 4a. A pan-focus lens 7 is located opposite to the surface 4a, and behind the lens 7 is disposed a light receiver 8 including a substrate on which a pair of arrays of photoelectric transducer elements $a_1$ to $a_n$ and $b_1$ to $b_n$ (where n represents an arbitrary positive integer) are formed. The upper half of the image which is split by the split prism 6 is projected onto one of arrays, $a_1$ to $a_n$, while the lower half of the image is projected onto the other array of transducer elements $b_1$ to $b_n$.

Figure 3:
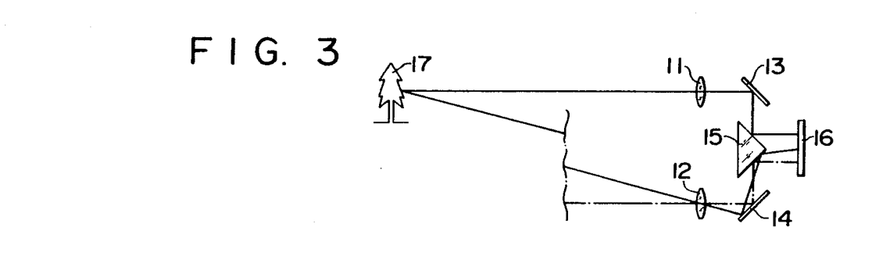
FIG. 3 is a schematic illustration of another optics system in which the focus detector of the invention may be applied.

FIG. 3 shows another form of optics system in which the focus detector of the invention may be employed. The optics system shown is designed to provide a twin lens distance measuring apparatus including a pair of objective lenses 11, 12. Light from an object being determined which passes through the lenses 11, 12 is reflected by reflecting mirrors 13, 14, respectively, and is then again reflected by a prism 15 for incidence onto a light receiver 16. The light receiver 16 includes a substrate on which a number of photoelectric transducer elements are formed in a colinear arrangement. The right-half or the upper half, as viewed in FIG. 3, of the arrangement represents a first array while the left-half or the lower half, as viewed in FIG. 3, represents a second array. The optics is arranged so that the image of the object 17 is focussed on the first and the second array in an equal manner when the object 17 is located at infinity, but the relative position of the images on the respective arrays shift as the object 17 moves closer.

Figure 4:
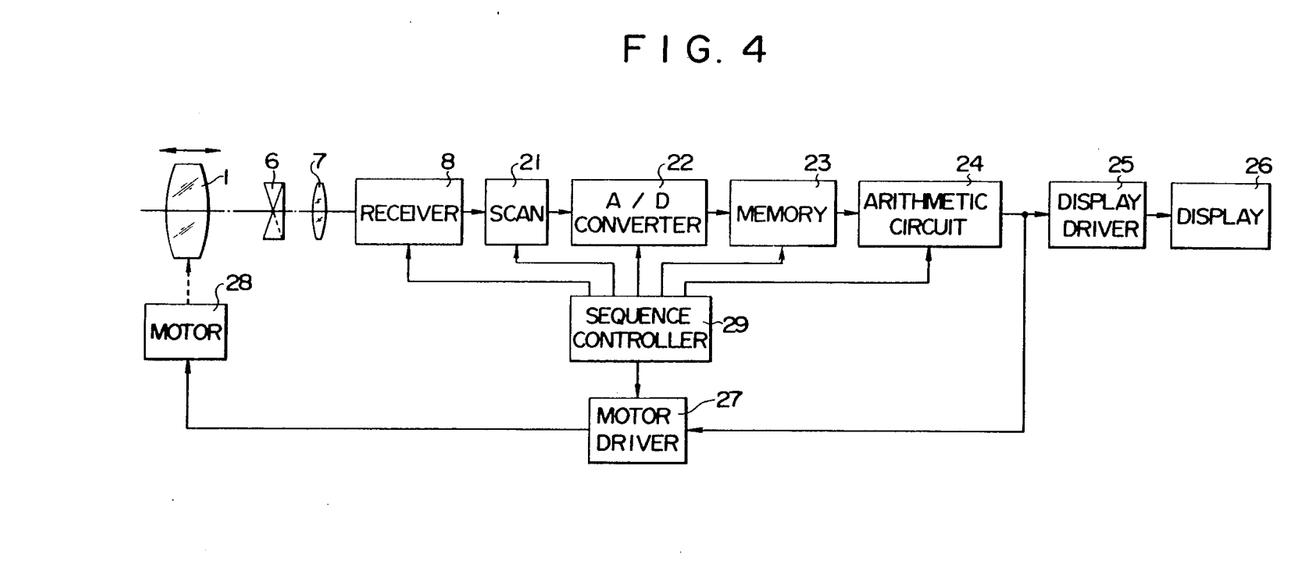
FIG. 4 is a block diagram of a focus detector according to one embodiment of the invention.

FIG. 4 shows the general arrangement of a focus detector according to the embodiment of the invention. In this embodiment, it is assumed that the optics system for single lens reflex camera as shown in FIG. 1 is used with the focus detector, but it should be understood that the optics system is not limited thereto, and that the optics for the measuring distance apparatus of FIG. 3 or other optics may be used as well.

As mentioned previously, the upper half of the image of the object being photographed is projected onto the first array of transducer elements $a_1$ to $a_n$ and the lower half of the image is projected onto the second array of transducer elements $b_1$ to $b_n$ of the light receiver 8 through the taking lens 1, split prism 6, pan-focus lens 7. The receiver 8 is connected to a scan circuit 21, which reads outputs $Va_1$ to $Va_n$ and $Vb_1$ to $Vb_n$ from the first and the second array in a sequential manner. The outputs $Va_1$ to $Va_n$ and $Vb_1$ to $Vb_n$ read by the scan circuit 21 is fed to an A/D converter 22, which converts them into corresponding digital signals for storage in a memory 23. An arithmetic circuit 24 receives outputs $Va_1$ to $Va_n$ and $Vb_1$ to $Vb_n$ in digital form from the memory 23, and detects and produces an in-focus signal D (see FIG. 5) after a given arithmetic operation to be described later. The in-focus signal D is fed through a display driver 25 to be supplied to a display 26, which displays an in-focus condition within the finder of the camera. The in-focus signal D is also fed to a motor drive circuit 27, which drives a motor 28 in accordance with the magnitude of the signal D so that the taking lens 1 may be moved in a direction to achieve an in-focus condition. When an in-focus condition is reached, the motor 28 ceases to be driven, thus maintaining the in-focus condition. It will be noted that the light receiver 8, the scan circuit 21, the converter 22, the memory 23, the arithmetic circuit 24 and the motor drive circuit 27 are connected to a sequence controller 29, which controls the operation of these components.

Figure 5:
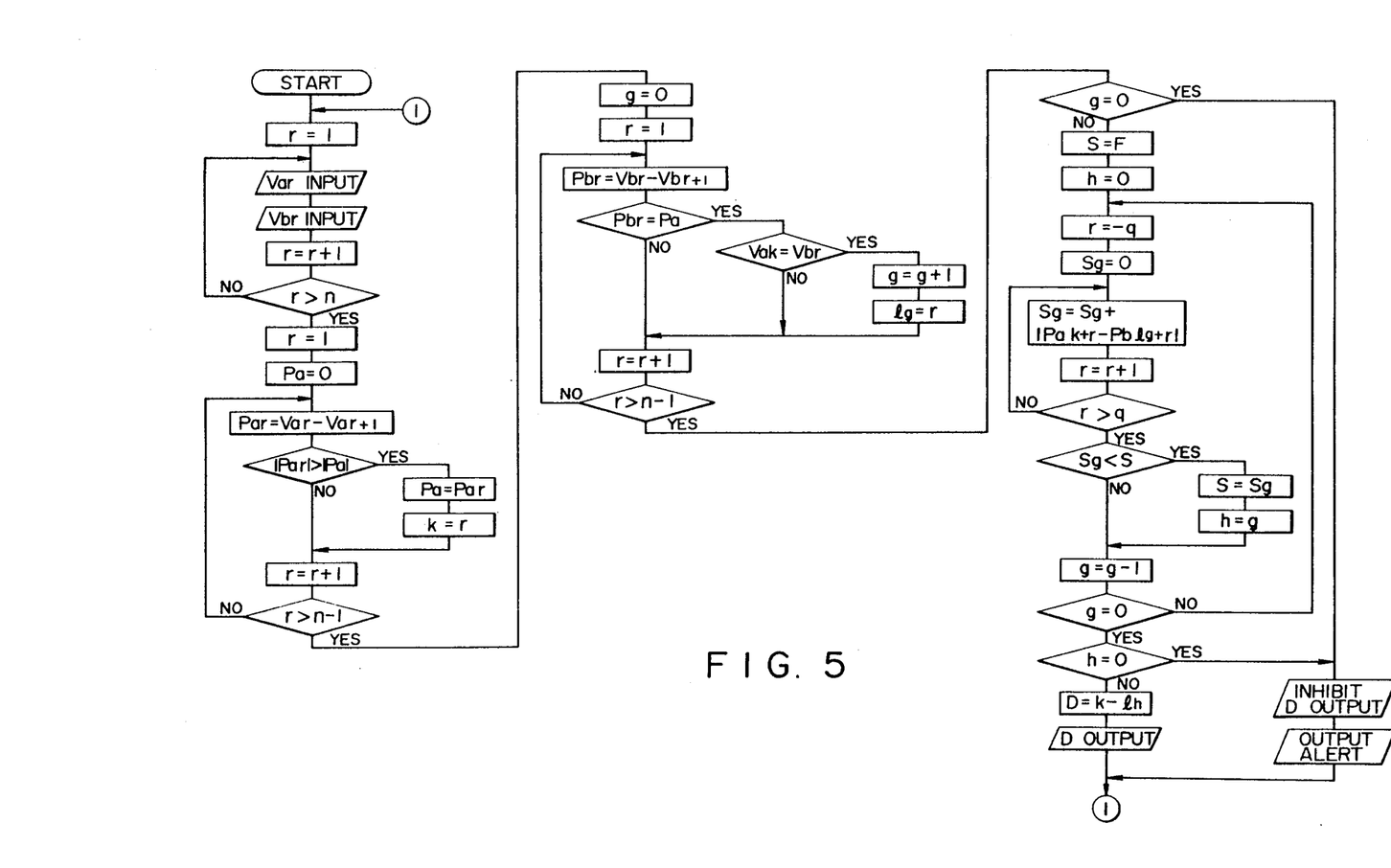
FIG. 5 is a flow chart, illustrating an exemplary sequence of arithmetic operations performed by an arithmetic unit contained in the focus detector of FIG. 4.

FIG. 5 shows a flow chart illustrating an exemplary sequence of arithmetic operations performed by the arithmetic circuit 24 of FIG. 4 in order to determine an in-focus condition. The flow chart is constructed to determine an in-focus condition on the basis of the relative position of those transducer elements located at characteristic points P, P', encircled in broken lines in FIG. 6, in the distribution of transducer outputs $Va_1$ to $Va_n$ and $Vb_1$ to $Vb_n$ where the slope is at its maximum.

The operation of the focus detector of the invention will now be described in conjunction with the flow chart of FIG. 5. Initially, the depression of a shutter release button (not shown) of a camera or the operation of a focussing command member (not shown) causes the sequence controller 29 to activate the light receiver 8, the scan circuit 21, the converter 22 and the memory 23, whereby transducer outputs $Va_1$-$Va_n$ from the first array as well as the transducer outputs $Vb_1$ to $Vb_n$ from the second array are stored in the memory 23. Assuming that the lens 1 does not focus the image onto a film surface which is disposed on a predetermined focal plane, the projection of the upper and the lower half of the image onto the first and the second array will produce distributions of transducer outputs $Va_1$ to $Va_n$ and $Vb_1$ to $Vb_n$, as indicated by the solid line curve A and the phantom line curve B in FIG. 6. As shown, the both distributions are laterally displaced from each other.

After storage of the transducer outputs $Va_1$ to $Va_n$ and $Vb_1$ to $Vb_n$ from the first and the second array in the memory 23, the sequence controller 29 then activates the arithmetic circuit 24, which then begins arithmetic operations in accordance with the flow chart of FIG. 5 in order to determine an in-focus condition.

The operation begins with a read operation to read the outputs $Va_1$ to $Va_n$ and $Vb_1$ to $Vb_n$ into the arithmetic circuit 24 from the memory 23. Specifically, the order of sequence (hereafter referred to as address) of each transducer element in the respective arrays, indicated by a parameter r, is set to an initial value of "1". By incrementing the parameter r, the output Var and Vbr are sequentially read into the circuit 24 until the entire output is supplied. The sequence gets out of the loop upon a decision of "r>n", thus completing the read operation.

The operation then enters the retrieval to search for the characteristic point in the distribution of outputs $Va_1$ to $Va_n$ from the first array $a_1$ to $a_n$, namely the point of maximum slope P (see FIG. 6). Initially, the parameter r is reset to "1", and an area Pa which stores the slope of the maximum slope point P is set to an initial value of "0". Subsequently, an arithmetic operation in accordance with the equation "Par=Var−Var+1" takes place while incrementing the parameter r by 1. In this manner, the absolute value |Par| of a particular slope Par is sequentially compared against the absolute value |Pa| stored in the area Pa. When the absolute value |Par| exceeds the absolute value |Pa|, the value of the slope Par is substituted into the area Pa, and the address r of the particular transducer element ar which produced the slope Par is stored in an area k. When the comparison of the absolute value |Pan-1| of the last slope Pan-1 against the absolute value |Pa| in the area Pa is completed, a decision of "r>n−1" causes the operation to get out of the loop, thus completing the retrieval of the maximum slope point P, with the maximum slope Pak stored in the area Pa and the address of the transducer element ak (hereafter referred to as the address of the maximum slope point P) which produced the output Vak of the maximum slope point P stored in the area k.

The operation then enters the retrieval of a corresponding slope point P' (see FIG. 6) in the distribution of outputs $Vb_1$ to $Vb_n$ from the second array $b_1$ to $b_n$ which corresponds to the maximum slope point P located by the above described retrieval. To this end, a parameter g is set to an initial value of "0" which stores the count of points if a plurality of slope points are found which exhibit the same slope as the maximum slope point P and produce the same output values. The parameter r is reset to "1". Subsequently, an arithmetic operation in accordance with the equation "Pbr=Vbr−Vbr+1" takes place while incrementing the parameter r by 1. A determination is then made if a particular slope Pbr is equal to the value in the area Pa or the maximum slope Pak, and if it is equal to the latter, if the outputs Vbr and Vak from the corresponding transducer elements br and ak are equal to each other. When "Pbr=Pa" and "Vak=Vbr", the parameter g is incremented by 1, and the address r of the transducer element br in the second array is stored in an area lg. When the comparison of the last slope Pbn-1 against the maximum slope Pak is completed, the number of such slope points P' is stored in the parameter g and the addresses of the slope points P' are stored in areas $l_1$ to $l_g$. A decision of "r>n−1" causes the operation to get out of the loop, thus completing the retrieval of corresponding slope points P'.

Subsequently, a determination is made to see if there existed a corresponding slope point P', by examining if the value of the parameter g is equal to "0". If the parameter g is equal to "0", an outputting of the in-focus signal D is inhibited while outputting an alert signal which indicates the failure to detect an in-focus condition. If the parameter g is not equal to "0", it follows that there existed at least one corresponding slope point P'. When a plurality of such points are found, a decision follows which determines which one of them represents a true corresponding slope point and which also determines if the true slope point permits a determination of an in-focus condition with a satisfactory accuracy. This decision takes place by choosing outputs from a plurality of transducer elements, which are q in number, a positive integer, on the either side of each of the corresponding slope points, deriving a total of the absolute values of differences, each between the slope at one of the q points and the slope of an output from corresponding one of a plurality of transducer elements, which are q in number, on either side of the maximum slope point P, and determining if the total is less than a predetermined permissible limit F, a positive value. Specifically, the permissible limit F is stored in an area S which stores the minimum value of the total. An area h which stores the order in sequence of the true corresponding slope point P' is set to a value of "0". A value of −q is set in the parameter r. An area Sg, which stores the total of the absolute values of differences between the slopes across the maximum slope point P and the slopes across the g-th corresponding slope point, is set to an initial value "0". While incrementing the parameter r by 1, the absolute value of a difference between a slope on either side of the maximum slope point P and a slope on either side of the g-th corresponding characteristic point is sequentially accumulated into the area Sg. When such accumulation is repeated (2q+1) times, a decision of "r>q" causes the operation to get out of the loop, thus completing the accumulation, with the total stored in the area Sg. The total in the area Sg is then compared against the value in the area S which stores the minimum value of the total. If the value in the area Sg is less than the value in the area S, the value in the area Sg is substituted into the area S, with the corresponding value of q stored in the area h. The described accumulation and decision, mentioned above in connection with the g-th corresponding characteristic point, is repeated for the remaining characteristic points while decrementing the parameter g by 1 until "g=0" is reached, whereupon the operation gets out of the loop.

A determination is then made whether there exists a corresponding characteristic point P' which satisfies the requirement that the total is less than the permissible limit F, by a decision to see if "h=0". In the absence of such corresponding characteristic point P', an outputting of the in-focus signal D is inhibited while outputting an alert signal. When there is a corresponding characteristic point P', an arithmetic operation to determine "$D=k-l_h$" is made. This represents the difference between the address k of the maximum slope point P in the first array and the address $l_h$ of the true corresponding slope point P' in the second array, or an offset between the both characteristic points. It is outputted as the in-focus signal D.

When the in-focus signal D is outputted, it is fed through the display driver 25 to permit the display 26 to indicate the in-focus condition in the arrangement of FIG. 4. Simultaneously, the motor drive circuit 27 drives the motor 28 in a direction to reduce the in-focus signal D to zero, thus causing a focussing operation through a movement of the taking lens 1.

Upon termination of movement of the taking lens 1, the motor 28 stops. Again the combination of the light receiver 8, the scan circuit 21 and the converter 22 causes the first and the second array $a_1$ to $a_n$ and $b_1$ to $b_n$ to produce outputs $Va_1$ to $Va_n$ and $Vb_1$ to $Vb_n$, which are stored in the memory. In the flow chart of FIG. 5, the end ① is returned to the start ①, thus performing a series of arithmetic operations for the second time in order to confirm an in-focus condition. The arithmetic operations take place in the similar manner as before, and if the in-focus signal D is equal to "0", the display 26 indicates an in-focus condition, completing the focussing operation without effecting any further rotation of the motor 28. In the event the in-focus signal D is not equal to "0", the motor 28 is driven again for rotation to perform a focussing operation. The series of arithmetic operations is repeated in accordance with the flow chart of FIG. 5 until the in-focus signal D becomes equal to "0", whereupon a focussing operation is completed.

The operation of the arithmetic circuit 24 which operates in accordance with the flow chart of FIG. 5 is terminated at the time when the power ceases to be supplied thereto in interlocked relationship with a shutter operation of the camera or the opening of the power switch. It will be noted that whenever the in-focus signal D is not outputted, but an alert signal is outputted, the display 26 indicates the incapability to detect an in-focus condition.

Figure 7:
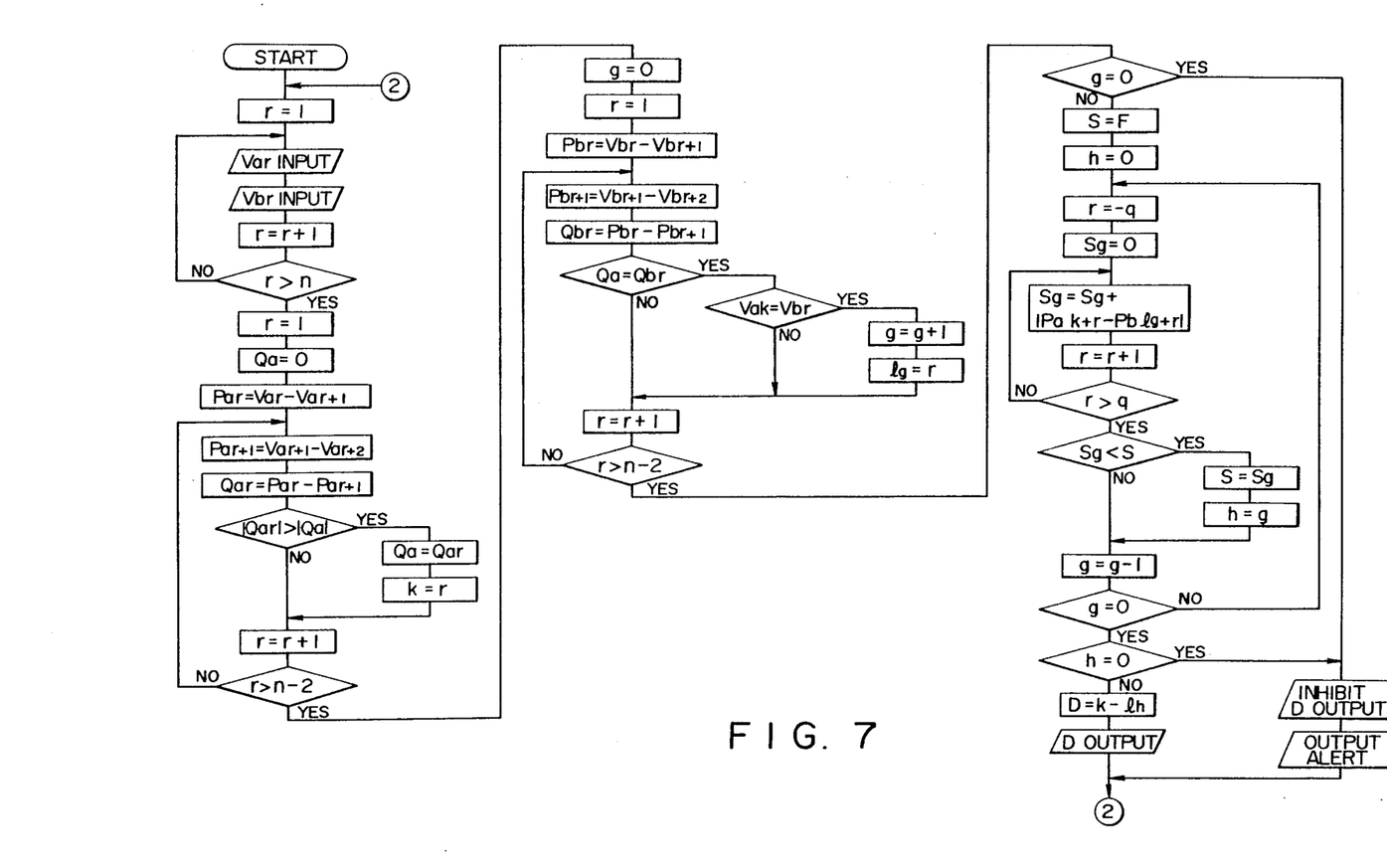
FIG. 7 is a flow chart of another sequence of arithmetic operations performed by the arithmetic unit contained in the focus detector of FIG. 4.

FIG. 7 is a flow chart representing another series of arithmetic operations performed by the arithmetic circuit 24 shown in FIG. 4 in order to detect an in-focus condition. It is to be understood that the flow chart is constructed so that points Q, Q' of maximum curvature in the respective distributions A ($Va_1$ to $Va_n$) and B ($Vb_1$ to $Vb_n$) are retrieved as characteristics points, thus enabling an in-focus condition to be determined on the basis of the relative position between transducer elements which produced outputs corresponding to the characteristic points.

In this flow chart, a read operation which reads the transducer outputs $Va_1$ to $Va_n$ and $Vb_1$ to $Vb_n$ stored in the memory 23 into the arithmetic circuit 24 in a sequential manner takes place in the same manner as mentioned above in connection with the flow chart of FIG. 5. Then follows a retrieval of a characteristic point in the distribution of outputs $Va_1$ to $Va_n$ from the first array, which is point Q of maximum curvature in the present example. In this instance, the procedure is similar to the retrieval of the point P of maximum slope effected in the flow chart of FIG. 5, except that arithmetic operations are performed in accordance with equations "$Par=Var-Var+1$", "$Par+1=Var+1-Var+2$" and "$Qar=Par-Par+1$", and the absolute value $|Qar|$ of the particular curvature Qar is compared against the absolute value $|Qa|$ of the content in an area Qa which stores the maximum curvature value, all in a sequential manner. A decision of "$r>n-2$" causes the operation to get out of the loop.

Then follows the retrieval of point Q' in the distribution of outputs $Vb_1$ to $Vb_n$ from the second array which corresponds to the maximum curvature point Q found during the above mentioned retrieval. The procedure followed to achieve such retrieval is similar to the retrieval of the slope point P' in the flow chart of FIG. 5 except that arithmetic operations are performed in accordance with equations "$Pbr=Vbr-Vbr+1$", "$Pbr+1=Vbr+1-Vbr+2$" and "$Qbr=Pbr-Pbr+1$", and a particular curvature Qbr is compared against the curvature of the point Q which is stored in the area Qa. A decision of "$r>n-2$" causes the operation to get out of the loop.

Subsequent processing is quite similar to the processing mentioned above in connection with the flow chart of FIG. 5, and therefore will not be repeated.

Figure 8:
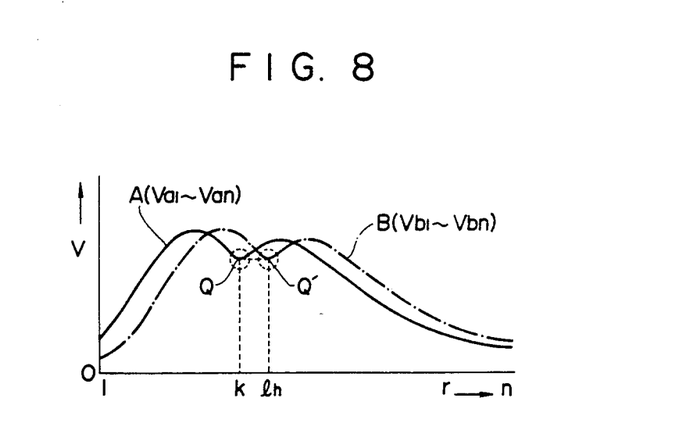
FIG. 8 graphically shows the characteristic points in the distribution of outputs from transducer elements which are chosen as points of maximum curvature values and which are retrieved by the flow chart of FIG. 7.
Figure 9:
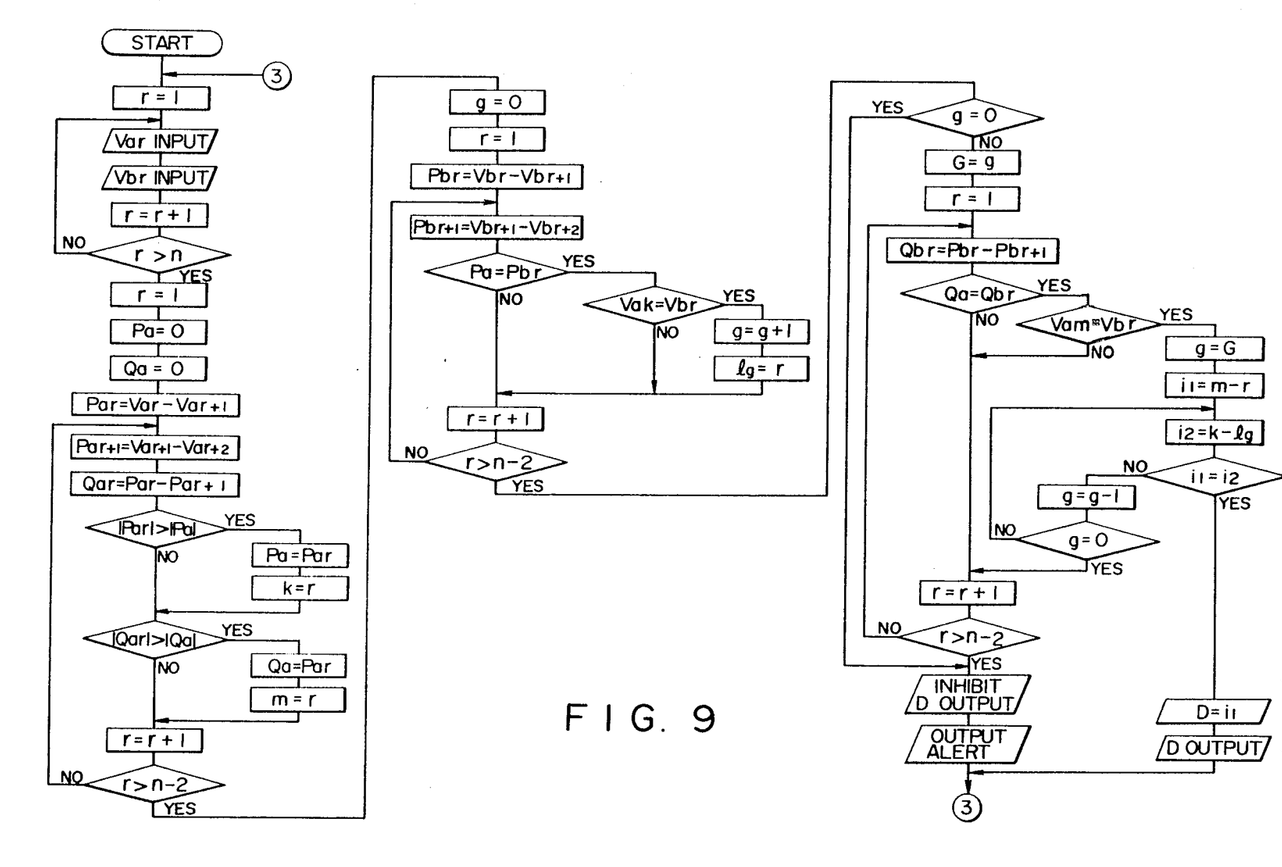
FIG. 9 is a flow chart of a further sequence of arithmetic operations performed by the arithmetic unit contained in the focus detector of FIG. 4.

FIG. 9 is a flow chart indicating a further series of arithmetic operations performed by the arithmetic circuit 24 shown in FIG. 4. This flow chart is constructed so that maximum slope points P, P' (see FIG. 6) and maximum curvature points Q, Q' (see FIG. 8) in the distributions A ($Va_1$ to $Va_n$) and B ($Vb_1$ to $Vb_n$) from the both arrays are retrieved as characteristic points, and an in-focus signal D is outputted when the offset between the maximum slope points P, P' is equal to the offset between the maximum curvature points Q, Q', the magnitude of the signal D being equal to such offset.

The flow chart begins with a read operation which reads transducer outputs $Va_1$ to $Va_n$ and $Vb_1$ to $Vb_n$ stored in the memory 23 into the arithmetic circuit 24, in a manner mentioned above in connection with the flow chart of FIG. 5. Then follows a retrieval of the characteristic points in the outputs $Va_1$ to $Va_n$ from the first array, which are the maximum slope point P and the maximum curvature point Q in the present example. The retrieval takes place as a combination of the retrieval of the maximum slope point P in the flow chart of FIG. 5 and the retrieval of the maximum curvature point Q in the flow chart of FIG. 7. The maximum slope is stored in the area Pa while the address of the particular transducer element which produces an output corresponding to the maximum slope point P is stored in the area k. The maximum curvature is stored in the area Qa while the address of the particular transducer element which produces an output corresponding to the maximum curvature point Q is stored in the area m. A decision of "r>n−2" causes the operation to get out of the loop.

Then follows the retrieval of the slope point P' in the distribution of output $Vb_1$ to $Vb_n$ from the second array which corresponds to the maximum slope point P found during the first mentioned retrieval. This retrieval takes place in the similar manner as the retrieval of the slope point P' in the flow chart of FIG. 5. A decision of "r>n−2" causes the operation to get out of the loop.

Subsequently, a determination is made whether there exists the corresponding slope point P', by examining if the value of the parameter g is equal to "0". If the parameter g is equal to "0", an outputting the in-focus signal D is inhibited while an alert signal indicating the failure to find an in-focus condition is outputted, generally in the same manner as mentioned above in connection to the flow chart of FIG. 5. When the parameter g is not equal to "0", the operation enters the retrieval of the point Q' in the distribution of outputs $Vb_1$ to $Vb_n$ from the second array which corresponds to the maximum curvature point Q which is already retrieved, and concurrently enters a matching examination which determines the offset between the maximum slope point P and the corresponding slope point P' in relation to the offset between the maximum curvature point Q and the corresponding curvature point Q'.

Initially, the value of the parameter g which represents the number of the corresponding slope points is preserved by substitution in a separate area G, and the parameter r is reset to "1". Subsequently, an arithmetic operation in accordance with the equation "Qbr=Pbr−Pbr+1" is performed while incrementing the parameter r by 1. A determination is made if a particular curvature Qbr is equal to the content of the area Qa which stores the maximum curvature Qam, and if it is equal to the latter, if the outputs Vbr, Vbm from the corresponding transducer elements br, am are equal to each other. When Qa=Qbr and Vam=Vbr, it is tentatively assumed that the prevailing value of the parameter r indicates the address of a true corresponding curvature point Q'. Then follows a matching examination between the offset between the maximum slope point P and the corresponding slope point P' and the offset between the maximum curvature point Q and the corresponding curvature point Q'. During the matching examination, the number of the corresponding slope points which has been saved in the area G is again fed to the parameter g as it is originally contained therein, and a difference between the address m of the maximum curvature point Q and the address r of the corresponding curvature point which is tentatively assumed to be true is calculated, and fed into an area $i_1$. Then, while decrementing the parameter g by 1, a difference between the address k of the maximum slope point P and the address $l_g$ of a plurality of corresponding slope points is calculated, and is fed into an area $i_2$. The content of the areas $i_1$ and $i_2$ are compared against each other, and when they are equal to each other, it means that the offset between the slope points P and P' and the offset between the curvature points Q, Q' are equal to each other. This difference can be regarded as the offset of the entire distributions $Va_1$ to $Va_n$ and $Vb_1$ to $Vb_n$ of the both arrays, and thus is outputted at the in-focus signal D.

When the comparison between the contents of the areas $i_1$ and $i_2$, which takes place while decrementing the parameter g, fails to reach a coincidence, it follows that the value of the parameter r cannot indicate the address of the true corresponding curvature point Q'. Hence, a search for the true corresponding curvature point Q' is repeated by seeking for a decision of "Qa=Qbr" and "Vam=Vbr" while incrementing the parameter r by 1 again. If the true corresponding curvature point Q' is found, the operation gets out through the decision of "$i_1=i_2$", outputting the in-focus signal D. If the true corresponding curvature point Q' cannot be eventually found, the operation gets out of the loop by a decision of "r>n−2", inhibiting an outputting of the in-focus signal D and outputting an alert signal which indicates the failure to detect an in-focus condition.

What is claimed is:

1. A focus detector of the image correlation type, comprising:
   imaging optics of the image correlation type for focussing light received from an object upon which a focussing operation is to be performed;
   light receiver means including a first and a second array of photoelectric transducer elements, each array positioned to receive a different portion of the light passing through said imaging optics, each of said transducer elements producing an output in accordance with the intensity of the light received thereby such that each said array generates a distribution of outputs indicative of the distribution of light received by the individual transducer elements of that array; and
   arithmetic means for detecting an in-focus condition as a result of an arithmetic operation which is performed on said distributions, said arithmetic operation including the identification of a characteristic point on the distribution of outputs from the first array, the identification of a corresponding characteristic point in the distribution of outputs from the second array, and the detection of an in-focus condition on the basis of the relative position between that particular transducer element in said first array which produces an output corresponding to said characteristic point in said first array and that particular transducer element in the second array which produces an output corresponding to said corresponding characteristic point in said second array.

2. A focus detector according to claim 1 in which the characteristic point represents a poinit of maximum slope in the distribution of outputs from the first array.

3. A focus detector according to claim 1 in which the characteristic point represents a point of maximum curvature in the distribution of outputs from the first array.

4. A focus detector according to claim 1 in which when a plurality of corresponding characteristic points are identified, a distribution of outputs from the second array in the vicinity of each of the corresponding characteristic points is compared against the distribution of outputs from the first array in the vicinity of the characteristic point, and a corresponding characteristic point which provides a minimum difference therebetween is chosen as a true corresponding characteristic point.

5. A focus detector according to claim 1 in which when a plurality of corresponding characteristic points are identified, the output for the characteristic point is compared against the output of each of the corresponding characteristic points, and the particular one of the corresponding characteristic points which provides an output equal to the output for the characteristic point is chosen as a true corresponding characteristic point.

6. A focus detector according to claim 1 in which a plurality of different kinds of characteristic points such as maximum slope point, maximum curvature point or the like are identified from the distribution of outputs from the first array, and a plurality of kinds of corresponding characteristic points are identified from the distribution of outputs from the second array which corresponds to the first mentioned plurality of characteristic points, and in which an in-focus condition is detected only when an offset in the relative position between the characteristic point and the corresponding characteristic point of each kind is equal to each other.

* * * * *